United States Patent
Wu et al.

(10) Patent No.: US 10,915,619 B2
(45) Date of Patent: Feb. 9, 2021

(54) VIRTUAL REALITY IDENTITY VERIFICATION

(71) Applicant: Advanced New Technologies Co., Ltd., George Town (KY)

(72) Inventors: Jun Wu, Hangzhou (CN); Xiaodong Zeng, Hangzhou (CN); Huanmi Yin, Hangzhou (CN); Feng Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/593,758

(22) Filed: Oct. 4, 2019

(65) Prior Publication Data

US 2020/0110865 A1    Apr. 9, 2020

Related U.S. Application Data

(63) Continuation of application No. 15/782,747, filed on Oct. 12, 2017, now Pat. No. 10,437,973.

(30) Foreign Application Priority Data

Oct. 13, 2016  (CN) .......................... 2016 1 0895118

(51) Int. Cl.
*H04W 12/00* (2009.01)
*G02B 27/01* (2006.01)
(Continued)

(52) U.S. Cl.
CPC .......... *G06F 21/32* (2013.01); *G02B 27/017* (2013.01); *G06F 3/011* (2013.01); *G06F 3/012* (2013.01);
(Continued)

(58) Field of Classification Search
None
See application file for complete search history.

(56) References Cited

U.S. PATENT DOCUMENTS 8,326,853 B2    12/2012  Richard et al.
8,675,952 B2 *   3/2014  Hwang ............. G06K 9/00315
                                                382/154
(Continued)

FOREIGN PATENT DOCUMENTS

CN    103761460    4/2014
CN    104683104    6/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Ali Shayanfar
(74) *Attorney, Agent, or Firm* — Fish & Richardson P.C.

(57) ABSTRACT

Interaction characteristics of a user interacting with a virtual reality (VR) terminal are obtained through preset sensing hardware in response to a request for execution of a target task requiring user identity verification. The obtained interaction characteristics of the user are compared with preset interaction characteristics of an authorized user of the VR terminal to verify identity of the user. The target task is executed and the user is authenticated as an identity-verified user of the VR terminal based on a successful user identity verification.

21 Claims, 3 Drawing Sheets

(51) Int. Cl.
  *G06F 21/32*   (2013.01)
  *G06F 3/01*    (2006.01)
  *H04L 29/06*   (2006.01)
  *G06F 21/36*   (2013.01)
  *G06F 21/31*   (2013.01)
  *G06F 21/62*   (2013.01)

(52) U.S. Cl.
  CPC .............. *G06F 3/013* (2013.01); *G06F 3/017* (2013.01); *G06F 21/31* (2013.01); *G06F 21/36* (2013.01); *G06F 21/62* (2013.01); *H04L 63/0861* (2013.01); *H04W 12/00508* (2019.01)

(56) References Cited

U.S. PATENT DOCUMENTS

| | | | | |
|---|---|---|---|---|
| 9,286,717 | B2* | 3/2016 | Le | G06T 7/246 |
| 9,288,196 | B2 | 3/2016 | Shuster | |
| 9,489,040 | B2* | 11/2016 | Antonyuk | G06F 3/011 |
| 10,142,378 | B2* | 11/2018 | Koeten | H04L 65/1073 |
| 10,220,181 | B2* | 3/2019 | Giap | A61B 6/46 |
| 10,437,973 | B2 | 10/2019 | Wu et al. | |
| 2008/0052779 | A1* | 2/2008 | Sinha | H04L 63/1441 726/22 |
| 2009/0327889 | A1* | 12/2009 | Jeong | G06F 16/954 715/706 |
| 2010/0321155 | A1* | 12/2010 | Ballard | H04L 9/3231 340/5.81 |
| 2012/0123786 | A1* | 5/2012 | Valin | G06Q 20/40 704/273 |
| 2014/0096036 | A1* | 4/2014 | Mohler | G06Q 10/10 715/753 |
| 2014/0282874 | A1* | 9/2014 | Bennette | H04L 63/102 726/3 |
| 2015/0262052 | A1* | 9/2015 | Pahuja | G06Q 20/40145 340/10.52 |
| 2015/0310497 | A1* | 10/2015 | Valin | G06Q 10/107 705/14.66 |
| 2015/0324562 | A1* | 11/2015 | Scavezze | G10L 15/22 345/156 |
| 2016/0173484 | A1* | 6/2016 | Grigg | H04L 63/10 726/7 |
| 2016/0197918 | A1 | 7/2016 | Turgeman et al. | |
| 2018/0075293 | A1* | 3/2018 | Schinas | A61B 5/165 |
| 2018/0107816 | A1 | 4/2018 | Wu et al. | |
| 2018/0329490 | A1* | 11/2018 | Yang | G06F 3/013 |
| 2019/0015699 | A1* | 1/2019 | Joo | A63B 69/0002 |
| 2019/0022487 | A1* | 1/2019 | Joo | A63B 24/0021 |

FOREIGN PATENT DOCUMENTS

| | | |
|---|---|---|
| CN | 105827406 | 8/2016 |
| JP | 2013-020304 | 1/2013 |
| KR | 20120076634 | 7/2012 |
| KR | 20120127344 | 11/2012 |
| KR | 20160118508 | 10/2016 |
| TW | 201633199 | 9/2016 |
| WO | WO 2014052895 | 4/2014 |
| WO | WO 2015004598 | 1/2015 |
| WO | 2016018487 | 2/2016 |
| WO | WO 2016111808 | 7/2016 |
| WO | WO 2016135473 | 9/2016 |

OTHER PUBLICATIONS

European Extended Search Report in European Patent Application No. 17859671.4, dated Jun. 18, 2019, 14 pages.
International Preliminary Report on Patentability in International Application No. PCT/US2017/056616, dated Mar. 5, 2019, 28 pages.
International Search Report and Written Opinion of the International Searching Authority issued in International Application No. PCT/US2017/056616 dated Jan. 5, 2018; 8 pages.
Nakamoto, "Bitcoin: A Peer-to-Peer Electronic Cash System," www.bitcoin.org, 2005, 9 pages.
de.reuters.com [online]. "Alibaba's new payment system lets virtual reality shoppers pay by nodding," Oct. 12, 2016, [retrieved on Jan. 23, 2020]. Retrieved from Internet: URL <https://de.reuters.com/article/alibaba-ant-financial-vr/alibabas-new-payment-system-lets-virtual-reality-shoppers-pay-by-nodding-idUKL4N1CI39W>, 7 pages.

* cited by examiner

VIRTUAL REALITY IDENTITY VERIFICATION

This application is a continuation of U.S. patent application Ser. No. 15/782,747, filed on Oct. 12, 2017, which claims priority to Chinese Patent Application No. 201610895118.4, filed on Oct. 13, 2016, the entire contents of which are herein incorporated by reference.

BACKGROUND

Virtual Reality (VR) technology produces an interactive three-dimensional (3D) environment on a computer using a computer graphics system and various control interfaces, providing a user with an immersive experience. Example VR terminals include a head-mounted helmet and glasses. As VR technology and hardware matures, VR terminals are becoming increasingly more popular, and various applications of VR technologies are being developed.

SUMMARY

The present disclosure describes methods and systems, including computer-implemented methods, computer program products, and computer systems for verifying an identity of a user of a virtual reality (VR) terminal.

In an implementation, interaction characteristics of a user interacting with a virtual reality (VR) terminal are obtained through preset sensing hardware in response to a request for execution of a target task requiring user identity verification. The obtained interaction characteristics of the user are compared with preset interaction characteristics of an authorized user of the VR terminal to verify identity of the user. The target task is executed and the user is authenticated as an identity-verified user of the VR terminal based on a successful user identity verification.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the disclosed approach can be used to verify an identity of a user wearing a VR terminal. The user identity verification can be used to facilitate various VR tasks that depend on user identity verification. Second, verification of the identity of the user can be performed on an ongoing-basis after an initial verification of user identity, which can provide an additional layer of security against fraudulent users. Third, supplemental identity verification processes can be performed to enhance user identity security in a VR session. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
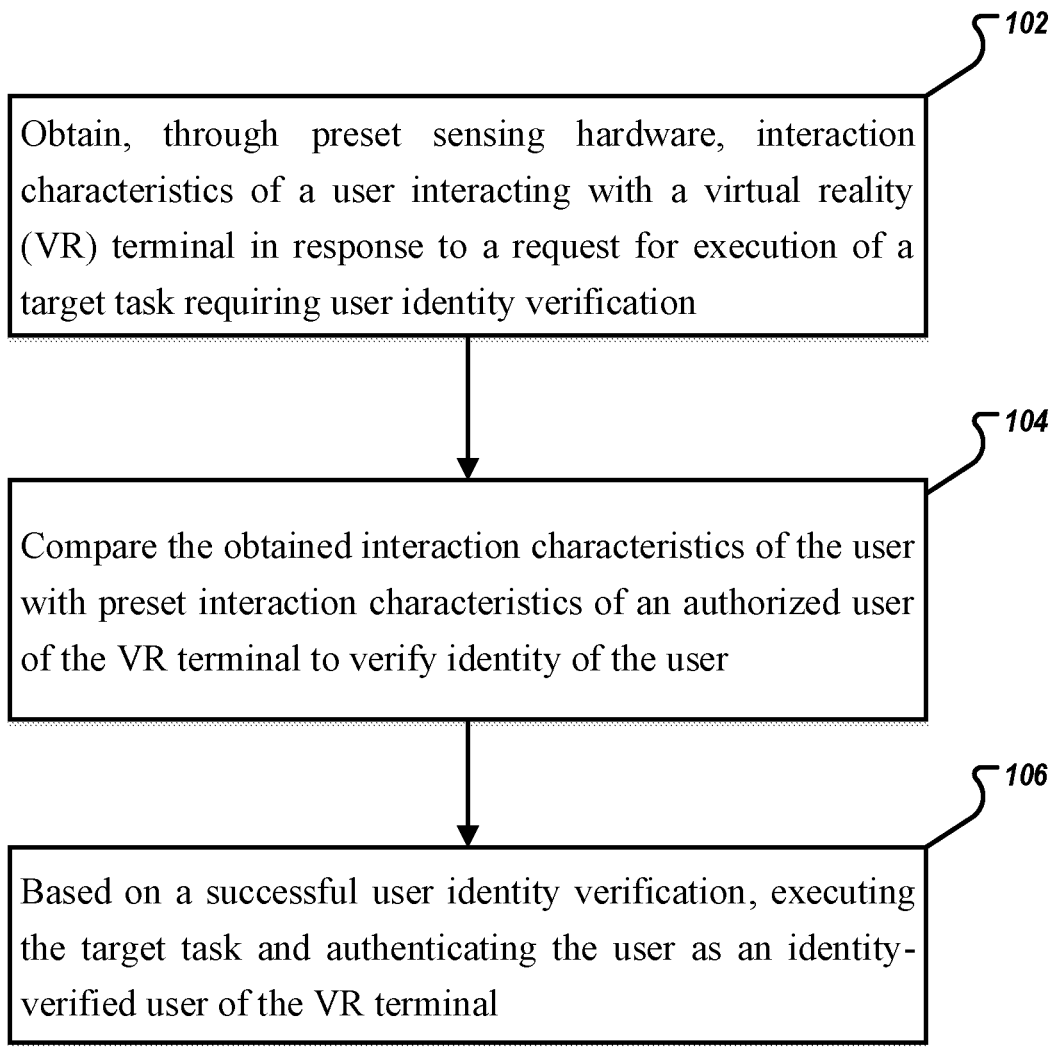
FIG. 1 is a flow chart illustrating an example of a method for verifying an identity of a user of a virtual reality (VR) terminal, according to an implementation of the present disclosure.

The following detailed description describes methods and systems, including computer-implemented methods, computer program products, and computer systems for verifying an identity of a user of a virtual reality (VR) terminal, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

A VR terminal is a device (for example, a headset or goggles worn by a user) implementing VR technology and provides a three dimensional (3D) immersive experience for the user. In general, the VR terminal outputs various VR scenario models developed to present different VR environments. Such VR scenarios can be developed to run on an operating system (for example, a Virtual Reality Operation System (VROS)), such that the user of the VR terminal obtains 3D immersive experiences through the output of the VR scenario in a VR terminal.

In general, a VR scenario model can be created by a developer using a VR modeling tool (such as, UNITY, 3DS MAX, and PHOTOSHOP). In some cases, the VR scenario model and a texture map of the VR scenario model can both be derived or developed from an existing real-life scenario (such as, a landscape, building interior, storefront, and the like). For example, texture can be created from photographs of the existing scenario, and a 3D model of the scenario captured in the photograph can be reproduced using the VR modeling tools.

Once the textures and the 3D model of the VR scenario have been prepared, the prepared textures and the 3D model are imported to a VR engine, such as the UNITY 3D PLATFORMER ("U3D"). A VR scenario is then rendered in multiple sensory aspects/dimensions (such as, sound effects, a graphical user interface (GUI), plug-ins, and lighting effects) in the U3D platform. Once the sensory aspects of the VR scenario have been developed, interaction codes governing rules of the interaction between the user and the VR scenario are written to complete creation of the VR scenario model.

Users can perform various activities, including activities that can require verification of the identity of the user. Such tasks are referred to as "target tasks". For example, the target task can include unlocking of the VR terminal, performing a fast payment transaction, and logging into an account. As such, ensuring integrity of the user identity verification process through the VR terminal is a critical issue.

Interaction characteristics of a user generally refer to ways in which the user interacts with the VR terminal during a VR session. For example, interaction characteristics can include a typical head posture of the user, a 3D gesture with a hand, or a displacement track. These interaction characteristics can be used to verify an identity of a user of the VR terminal. Furthermore, certain interaction characteristics of a user interacting with a VR terminal can reflect behavioral factors unique to the particular user. As such, interaction characteristics of the user can be used to enhance the security of the identity verification process in the VR session.

VR terminals can include various sensing hardware that can obtain various interaction characteristics of the user of the VR terminal. Examples of sensing hardware include an infrared sensor, an image sensor, a laser sensor, a radar sensor, a gyroscope, and an accelerometer. The obtained interaction characteristics of the user can be used to determine behavioral factors unique to the particular user.

FIG. 1 is a flow chart illustrating an example of a method for verifying an identity of a user of a virtual reality terminal, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, interaction characteristics of a user interacting with a virtual reality (VR) terminal are obtained through preset sensing hardware, in response to a request for execution of a target task requiring user identity verification. For example, during a VR session, the user can trigger various target tasks requiring user identity verification (such as, unlocking the VR terminal, performing a fast payment transaction, and logging into an account).

In some implementations, a particular VR terminal can be associated with one or more user profiles of users who are authorized to use the VR terminal. The user profile can include identity information of the user, preset interaction characteristics, and other user-related information (such as, login IDs and passwords to various network/Web-based services). The preset interaction characteristics can be set by the owner of the user profile to be used during an identity verification process, and access permission to the contents of the user profile can be granted to a user whose identity has been verified to be the owner of the user profile. From 102, method 100 proceeds to 104.

At 104, the obtained interaction characteristics of the user are compared with preset interaction characteristics of an authorized user of the VR terminal to verify identity of the user. In some implementations, the comparison can require an exact match between some obtained interaction characteristics of the user and the preset interaction characteristics. In some cases, however, the comparison result can instead require a degree of similarity between the obtained interaction characteristics of the user and the preset interaction characteristics. In such cases, the identity of the user can be verified when the degree of similarity reaches a preset threshold. In some implementations, the comparison can be based on fuzzy matching techniques. Use of fuzzy matching techniques can be beneficial in avoiding situations where identities of a legitimate user cannot be verified due to preset interaction characteristics that are complicated or difficult to precisely reproduce. From 104, method 100 proceeds to 106.

At 106, based on a successful user identity verification, the target task is executed, and the user is authenticated as an identity-verified user of the VR terminal. Once the VR terminal has successfully verified the identity of the user, the VR terminal can grant access permissions to the user profile containing user identity information, which can be used by various VR scenarios to enhance user convenience in VR sessions. After 106, method 100 stops.

Now, an application of the method 100 in context of unlocking of a VR terminal by a user will be described.

When the user wears the VR terminal to begin a VR session, the VR terminal can sense that the terminal is worn by a user (for example, using pressure, light, or other sensors) and can display a 2D or 3D lock screen interface. The lock screen can contain, for example, several virtual elements for initiating the unlocking process. The user can select the virtual element through various VR interaction operations to initiate a target task of unlocking the VR terminal.

For example, a virtual button for initiating the unlocking process can be provided in the lock screen interface. The user can control movement of an operating focus, or a visual focus, by using a head posture, a three-dimensional gesture, or an external device (such as, a joystick or handle), to position the operating focus on the virtual button. Then, the user can perform a VR interaction operation, such as simple sliding of the operating focus onto the virtual button, to initiate the unlocking process for the VR terminal.

In some implementations, a physical button for initiating the unlocking process can be associated with the VR terminal or provided on an external device associated with the VR terminal. For example, the physical button can be provided on the exterior of the VR terminal or on an external joystick attached to the VR terminal. In such cases, the process for unlocking the VR terminal can be initiated by pressing the physical button instead of interacting with a virtual button.

Once the process of unlocking the VR terminal is initiated, the VR terminal can transmit an instruction requesting unlocking of the VR terminal to the operating system. For example, the instruction can specifically be an unlocking signal. After receiving the instruction requesting unlocking of the VR terminal, the operating system of the VR terminal can respond to the instruction, by executing method 100 for user identity verification to start the process of unlocking the VR terminal.

Upon initiation of the process of unlocking the VR terminal, the lock screen can prompt the user to provide one or more interaction characteristics to unlock the VR terminal. In response, the user then performs one or more actions (for example, particular actions prompted by the VR terminal) at the lock screen to provide interaction characteristics for analysis. Once the operating system determines that the interaction characteristics provided by the user match preset interaction characteristics associated with the user, the operating system of the VR terminal can grant the user permission to access the VR operating system, allowing the user to use the VR terminal.

Interaction characteristics of the user can include head posture of the user, a 3D gesture by a hand, or a displacement track (for example, a particular pattern or design) generated by movement of a visual focus in the VR scenario. The visual focus in the VR scenario can be controlled by the user through the head posture, the 3D gesture, or the external device. Examples of head posture of the user include nodding and shaking of the head. These interaction characteristics can be set by an authorized user of the VR terminal as preset interaction characteristics that can be used in verifying identity of the user of the VR terminal in future VR sessions.

Following is an example of user identity verification based on a preset head posture of the user. The user of the VR terminal first triggers the unlocking procedure. The operating system of the VR terminal can then track displacement of the head of the user through gravity-sensing hardware provided in the VR terminal, obtaining the head displacement data measured by the gravity-sensing hardware.

The obtained head displacement data can be processed by using an augmented reality (AR) engine in the operating system to calculate parameters (such as, shift and rotation of the head of the user with respect to X, Y, and Z-axes of the VR scenario). Data modeling is conducted based on the calculated parameters to determine the head posture of the user. Then, the determined head posture is compared with a preset head posture set by the authorized user of the VR terminal. If the comparison result matches or is sufficiently close based on a preset threshold, the identity of the user can be successfully verified. At this time, the operating system can unlock the VR terminal, grant an access permission of the operating system, and remove the lock screen interface.

Following is an example of user identity verification based on a preset 3D gesture of the user. Examples of 3D gestures include grabbing, swiping, and rotation in a specific direction in view of the VR terminal (for example, in the air in front of the user). The user of the VR terminal first triggers the unlocking procedure. The operating system of the VR terminal can then track displacement of the hand of the user through various sensing hardware (for example, a visual camera) provided in the VR terminal.

Various techniques for 3D gesture identification include a Time of Flight (ToF) technique, a dual-camera binocular imaging technique, a structured light technique, and a micro radar technique. Sensing hardware used by the operating system during identification of the 3D gesture of the user can depend on the techniques used for identifying the 3D gesture. For example, ToF techniques can be implemented using an infrared sensor. The dual-camera binocular imaging technique can be implemented using an image sensor. The structured light technique can be implemented using a laser sensor. The micro radar technique can be implemented using a radar sensor.

The obtained hand displacement data can be calculated by using the AR engine in the operating system to calculate parameters such as shift and rotation of the hand of the user with respect to the X, Y, and Z-axes of the VR scenario. Data modeling is conducted based on these parameters to determine the 3D gesture of the user. Then, the determined three-dimensional gesture is matched with preset 3D gesture (for example, preset 3D gesture models) that is set by the authorized user of the VR terminal. If the comparison result matches or is sufficiently close, the identity of the user can be successfully verified. At this time, the operating system can unlock the VR terminal, grant an access permission of the operating system, and remove the lock screen interface.

Following is an example of user identity verification based on a preset moving track of the operating focus. The user can control the operating focus to move on the lock screen interface by using the head posture or the 3D gesture, or by operating an external device, thus generating a moving track.

The user of the VR terminal first triggers the unlocking procedure. The operating system of the VR terminal can then track displacement of the head, the hand, and the external device of the user. For example, gravity-sensing hardware can be provided in a VR helmet, with the external device, or worn on the hand of the user. The displacement of the operating focus in the VR scenario can be determined by a combination of the displacements of the head of the user, the gesture, and the external device.

A moving track of the operating focus in the VR scenario is calculated. In order to aid the user of the VR terminal in visualizing the generated moving track, the operating system can, for example, output the calculated operating track in the lock screen interface.

Then, the generated moving track is compared with a preset moving track set by the authorized user of the VR terminal. If the comparison result matches or is sufficiently close, the identity of the user can be successfully verified. At this time, the operating system can unlock the VR terminal, grant an access permission of the operating system, and remove the lock screen interface.

In some cases, the identity verification attempt can be unsuccessful. For example, the interaction characteristics of the user of the VR terminal may not match or be sufficiently close to match preset interaction characteristics. In such cases, the operating system may not produce any response, and a counter can be started to count the number of unsuccessful identity verification attempts. When the number of unsuccessful identity verification attempts becomes greater than a preset number, the operating system can initiate a supplemental identity verification procedure for the user or lock the VR terminal for a preset amount of time.

In some implementations, the supplemental identity verification can be a biometric authentication. Biometric authentication can be executed by collecting biometric characteristics of the user using biometric identification hardware associated with the VR terminal. Examples of biometric features that can be used for biometric authentication include fingerprints, iris/sclera patterns, and facial profile.

As part of a biometrics-based supplemental identity verification procedure, the operating system can output on the lock screen interface a message that prompts the user to provide biometric characteristics for supplemental identity verification. For example, when the biometric characteristic is a fingerprint, the prompt message can be "Please input fingerprint information to complete unlocking."

The operating system can obtain biometric characteristics of the user through the biometric identification hardware, and match the obtained biometric characteristics with preset biometric characteristics of an identity-verified user of the VR terminal. If the obtained biometric characteristics match the preset biometric characteristics of the identity-verified user of the VR terminal, the identity verification of the user of the VR terminal is determined to be successful, and the VR terminal is unlocked.

In some implementations, the supplemental identity verification can be a password-based authentication using an identity verification password. The identity verification password can be a static password preset by an authorized user. Alternatively, the identity verification password can be a dynamic password (such as, a code or text string at the time of attempted VR terminal access) transmitted by the operating system to the user, delivered for example, through a call, a text message, or an email message.

As part of the password-based supplemental identity verification procedure, the operating system can display an input box on the lock screen interface, and output a message prompting the user to input the identity verification password to complete the supplemental identity verification. For example, the prompt message can be "Please input the identity verification password to complete unlocking."

After the user inputs the identity verification password in the lock screen interface, the operating system matches the identity verification password with the preset or dynamically-transmitted identity verification password. If the two match, the identity verification for the current user of the VR terminal is determined to be successful, and the VR terminal is unlocked.

In cases where the identity verification of the user is successful, the operating system can grant execution permissions of a target task to the user. The identity-verified user can later remove the VR terminal for various reasons, such as to take a break. In such situations where a user is authenticated by the VR terminal, but is no longer in physical control of the VR terminal, another non-authenticated user could possibly access/wear the VR terminal and perform tasks or gain access to various VR scenarios as if he or she is the identity-verified user.

To offer additional security in such situations, the VR terminal can continue to verify the user identity beyond an initial successful user identity verification. Such ongoing identity verification can be performed based on ongoing collection of additional interaction characteristics of the user. The additional interaction characteristics can include all interactions of the user with the VR terminal, such as 3D gesture, head posture, and moving track of an operating focus.

In general, individual users can have unique identifying characteristics or habitual characteristics (behavioral interaction characteristics) in the way they interact with a VR terminal. For example, a user can have a habitual head posture in which the user nods in a specific range of movement and at a certain speed. As another example, a user can have a habitual 3D gesture, in which the user reaches out to a virtual item in a certain hand movement trajectory and speed. As yet another example, a user can have a habitual moving track of the operating focus, in which the user shifts the operating focus in a certain direction at a certain speed when reading a document. As such, the additional interaction characteristics collected from the user can include various behavioral interaction characteristics that can be used to help identify a user of the VR terminal.

Based on a determined presence of behavioral interaction characteristics in collected interaction characteristics, the interaction characteristics of the user can be compared with the behavioral interaction characteristics of the identity-verified user to perform ongoing identity verification. Such ongoing identity verification can be performed in the background of the VR operating system without additional user input, such that the ongoing verification process is transparent to the user to enhance user convenience as well as security of the VR terminal.

In some implementations, behavioral interaction characteristics of a user are modeled using a characteristic identification model. For example, the characteristic identification model can be based on a neural network or a trend analysis model. The characteristic identification model can be trained using a preset deep-learning algorithm based on training behavioral characteristic samples of an authorized user of the VR terminal. The behavioral characteristics samples for use during training of the model can be obtained, for example, during initial setup of a user account.

The preset deep-learning algorithms can include various machine-learning algorithms such as a neural network and various regression algorithms. The characteristic identification model can be trained, for example, on the VR terminal carrying the deep-learning algorithms. Alternatively, or additionally, the characteristic identification model can be trained on a host matching the VR terminal (such as, a host computer associated with the VR terminal), or on a cloud server.

Once the characteristic identification model is generated, the operating system can store the trained characteristic identification model and retrieve the model based on the current authenticated user of the VR terminal. As the authenticated user wearing the VR terminal continues to use the VR terminal, the operating system can continue to collect interaction characteristics of the user through various sensing hardware, and provide the collected interaction characteristics for comparison to the characteristic identification model to determine whether the collected interaction characteristics match the behavioral interaction characteristics of the currently authenticated user of the virtual reality terminal.

If it is determined through identification of the model that the collected interaction characteristics do not match the behavioral interaction characteristics of the currently authenticated user of the VR terminal, it is reasonable to determine that the collected interaction characteristics can be interaction behaviors generated by a non-authenticated user and that the VR terminal is no longer in physical control of the authenticated user. In such cases, the operating system can lock the VR terminal and prompt the user of the VR terminal to unlock the VR terminal (for example, using the method 100). Alternatively, or additionally, the operating system can execute a supplemental identity verification process to continue use of the VR terminal (to provide an additional layer of security).

In addition to the ongoing identity verification process previously described, various other security measures can also be executed on the VR terminal once the VR terminal is unlocked successfully. For example, an unlock timeout mechanism can be used. The timeout can be based on a duration of inactivity by the user, in which the VR terminal is automatically locked when the operating system of the VR terminal does not detect any interaction operations during a preset duration. The timeout can additionally be based on a combination of time and inactivity, in which even in presence of continuous interaction with the VR terminal, an authenticated session needs to be renewed after a preset duration. Such combinations can be useful in providing additional security for scenarios that require a high level of security, such as banking and payment transactions.

While various examples of the user identity verification process have been provided in context of unlocking of the VR terminal, method 100 for user identity verification can be generally applied to other scenarios and tasks that require verification of user identity. For example, the identity verification method can be applied to a fast payment scenario in the VR scenario, in which the target task can be a verification task based on fast payment in the VR scenario. In this case, the operating system can verify a payment identity of a user when the user performs fast payment in the VR scenario (for example, by executing the method 100), and complete payment only after a successful identity verification.

After the successful identity verification of the user, the operating system can continue to verify whether the interaction characteristics of the user wearing the VR terminal match the behavioral interaction characteristics of the authenticated user through the trained behavioral interaction characteristic identification model. If the operating system determines that the interaction characteristics of the user currently wearing the VR terminal do not match the behavioral interaction characteristics of the authenticated user, the operating system can execute supplemental identity verification on the identity of the user currently wearing the VR terminal.

As another example, the identity verification method can be applied to an account login scenario in the VR scenario, in which the target task can be a verification task based on account login in the VR scenario. In this case, the operating system can verify a login identity of a user when the user performs an account login in the VR scenario (for example, by executing the method 100), and completes login by interacting with a corresponding login server only after a successful identity verification.

After the successful identity verification of the user, the operating system can continue to verify whether the interaction characteristics of the user wearing the VR terminal match the behavioral interaction characteristics of the authenticated user through the trained behavioral interaction characteristic identification model. If the operating system determines that the interaction characteristics of the user currently wearing the VR terminal do not match the behavioral interaction characteristics of the authenticated user, the operating system can execute supplemental identity verification on the identity of the user currently wearing the VR terminal.

Figure 2:
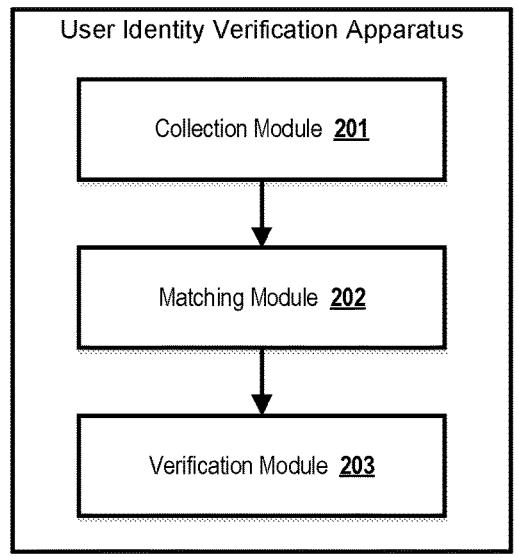
FIG. 2 is a block diagram of a user identity verification apparatus, according to an implementation of the present disclosure.

FIG. 2 is a block diagram illustrating a user identity verification apparatus, according to an implementation of the present disclosure is shown. The apparatus 200 includes a collection module 201, a matching module 202, and a verification module 203.

The collection module 201 is configured to obtain interaction characteristics of a user interacting with a VR terminal through preset sensing hardware in response to a request for execution of a target task requiring user identity verification. The matching module 202 is configured to compare the obtained interaction characteristics of the user with preset interaction characteristics of an authorized user of the VR terminal to verify an identity of the user. The verification module 203 is configured to execute the target task and authenticate the user as an identity-verified user of the VR terminal based on a successful user identity verification.

In some implementations, the apparatus 200 can further include a supplemental identity verification module (not illustrated). The supplemental identity verification module is configured to execute supplemental identity verification for the user when the number of unsuccessful verification attempts for the user wearing the virtual reality terminal becomes greater than a preset number. In some implementations, the supplemental identity verification module is further configured to execute supplemental identity verification for the user wearing the virtual reality terminal if the obtained additional interaction characteristics of the user does not match with behavioral interaction characteristics of the identity-verified user of the virtual reality terminal.

Additionally, the supplemental identity verification module can be configured to collect biometric characteristics of the user by using preset biometrics identification hardware, compare the collected biometric characteristics with preset biometric characteristics of the identity-verified user of the virtual reality terminal to determine whether the user is the identity-verified user of the VR terminal, and based on the determination that the user is the identity-verified user of the VR terminal, verify the identity of the user; or obtain an identity verification password input by the user, compare the obtained identity verification password with a preset identity verification password to determine whether the user is the identity-verified user of the VR terminal, and based on the determination that the user is the identity-verified user of the VR terminal, verify the identity of the user.

In some implementations, the apparatus 200 can further include an identification module (not illustrated). The identification module is configured to collect additional interaction characteristics of the user, the additional interaction characteristics comprising behavioral interaction characteristics, by using the preset sensing hardware after successful user identity verification; compare the obtained additional interaction characteristics of the user with behavioral interaction characteristics of the identity-verified user of the VR terminal to determine whether the user is the identity-verified user of the VR terminal; and based on the determination that the user is not the identity-verified user of the VR terminal, execute supplemental identity verification for the user.

In some implementations, the identification module is configured to compare the obtained additional interaction characteristics of the user with behavioral interaction characteristics of the identity-verified user of the VR terminal by obtaining a preset behavioral interaction characteristic identification model representing the behavioral interaction characteristics of the identity-verified user of the VR terminal, wherein the preset behavioral interaction characteristics identification model is generated by training with behavioral interaction characteristics training samples of the identity-verified user of the VR terminal using a preset deep learning algorithm; and comparing the obtained additional interaction characteristics of the user with the preset behavioral interaction characteristic identification model to determine whether the user is the identity-verified user of the VR terminal.

In some implementations, the target task can include a task for unlocking the virtual reality terminal.

Figure 3:
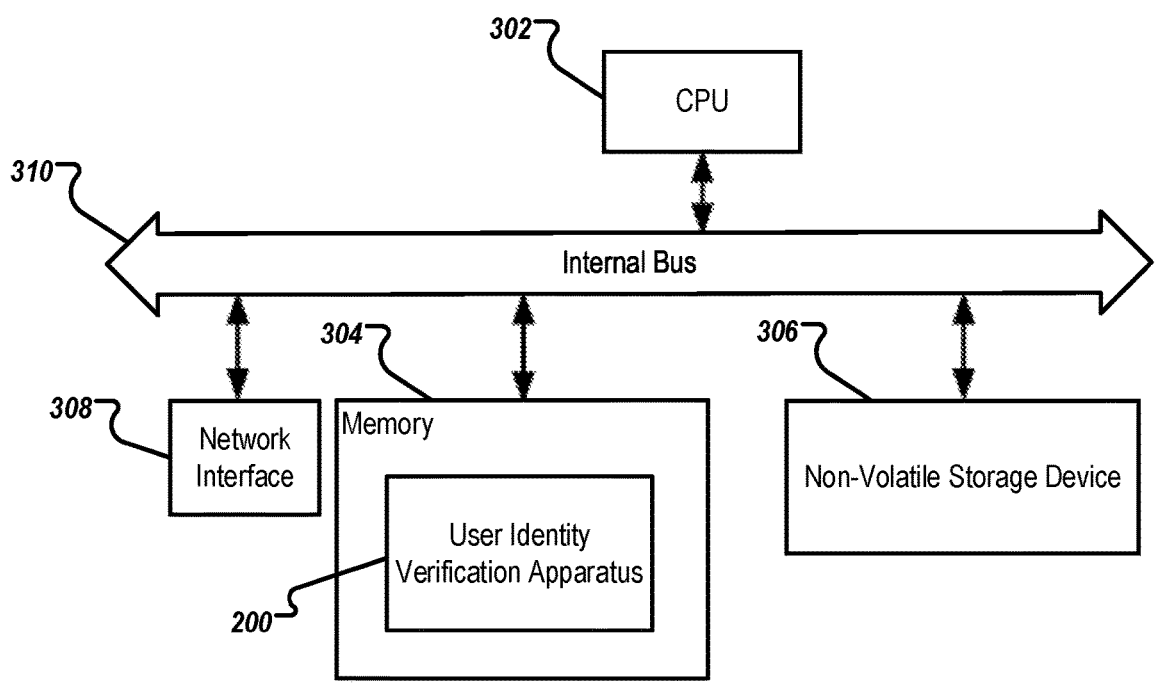
FIG. 3 is a block diagram of a VR terminal implementing the user identity verification apparatus of FIG. 2, according to an implementation of the present disclosure.

FIG. 3 is a block diagram illustrating a virtual reality terminal 300 implementing the user identity verification apparatus of FIG. 2, according to an implementation of the present disclosure is shown. The VR terminal 300 generally includes a CPU 302, a memory 304, a non-volatile storage device 306, a network interface 308, and an internal bus 310. The user identity verification apparatus 200 can be a logic apparatus combining software and hardware formed after running of a computer program loaded in the memory 304 via the CPU 302.

Figure 4:
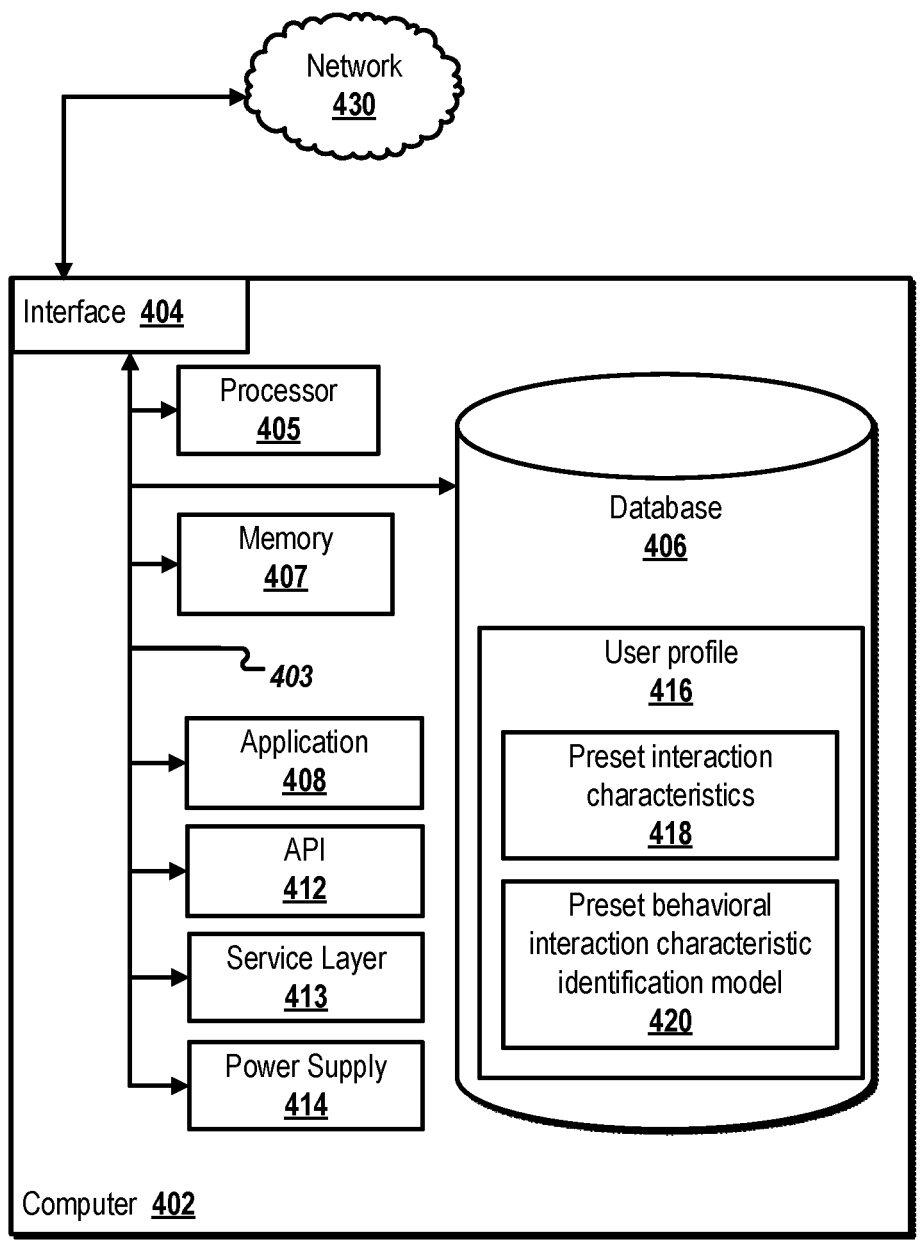
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

At a high level, the computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users (for example, from a command console or by another internal access method), external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds the previously described user profile 416 that includes preset interaction characteristics 418 and preset behavioral interaction characteristic identification model 420.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Described implementations of the subject matter can include one or more features, alone or in combination.

For example, in a first implementation, a computer-implemented method, comprising: obtaining, through preset sensing hardware, interaction characteristics of a user interacting with a virtual reality (VR) terminal in response to a request for execution of a target task requiring user identity verification; comparing the obtained interaction characteristics of the user with preset interaction characteristics of an authorized user of the VR terminal to verify identity of the user; and based on a successful user identity verification, executing the target task and authenticating the user as an identity-verified user of the VR terminal.

The foregoing and other described implementations can each, optionally, include one or more of the following features:

A first feature, combinable with any of the following features, wherein the interaction characteristics comprise any one of: a head posture of the user; a three-dimensional gesture; or a displacement track generated by movement of a visual focus, the visual focus controlled through the head posture, the three-dimensional gesture, or an external device.

A second feature, combinable with any of the previous or following features, wherein the user identity verification has been unsuccessful, and wherein the method comprises: based on the unsuccessful user identity verification, determining a number of unsuccessful verification attempts; determining whether the number of unsuccessful verification attempts is greater than a preset number; based on the determination that the number of unsuccessful verification attempts is greater than the preset number, executing supplemental identity verification for the user; and based on a successful supplemental identity verification, executing the target task.

A third feature, combinable with any of the previous or following features, wherein the user identity verification has been successful, and wherein the method comprises: obtaining, through the preset sensing hardware, additional interaction characteristics of the user interacting with the VR terminal, the additional interaction characteristics comprising behavioral interaction characteristics; comparing the obtained additional interaction characteristics of the user with behavioral interaction characteristics of the identity-verified user of the VR terminal to determine whether the user is the identity-verified user of the VR terminal; and based on the determination that the user is not the identity-verified user of the VR terminal, executing supplemental identity verification for the user.

A fourth feature, combinable with any of the previous or following features, wherein the comparing the obtained additional interaction characteristics of the user with behavioral interaction characteristics of the identity-verified user of the VR terminal comprises: obtaining a preset behavioral interaction characteristic identification model representing the behavioral interaction characteristics of the identity-verified user of the VR terminal, wherein the preset behavioral interaction characteristics identification model is generated by training with behavioral interaction characteristics training samples of the identity-verified user of the VR terminal using a preset deep learning algorithm; and comparing the obtained additional interaction characteristics of the user with the preset behavioral interaction characteristic identification model to determine whether the user is the identity-verified user of the VR terminal.

A fifth feature, combinable with any of the previous or following features, wherein the executing supplemental identity verification for the user comprises: obtaining, through preset biometrics identification hardware, biometric characteristics of the user; comparing the obtained biometric characteristics with preset biometric characteristics of the identity-verified user of the VR terminal to determine whether the user is the identity-verified user of the VR terminal; and based on the determination that the user is the identity-verified user of the VR terminal, verifying the identity of the user; or obtaining, from the user, an identity verification password; comparing the obtained identity verification password with a preset identity verification password to determine whether the user is the identity-verified user of the VR terminal; and based on the determination that the user is the identity-verified user of the VR terminal, verifying the identity of the user.

A sixth feature, combinable with any of the previous or following features, wherein the target task comprises a task for unlocking the VR terminal.

In a second implementation, a non-transitory, computer-readable medium storing one or more instructions executable by a computer system to perform operations comprising: obtaining, through preset sensing hardware, interaction characteristics of a user interacting with a virtual reality (VR) terminal in response to a request for execution of a target task requiring user identity verification; comparing the obtained interaction characteristics of the user with preset interaction characteristics of an authorized user of the VR terminal to verify identity of the user; and based on a successful user identity verification, executing the target task and authenticating the user as an identity-verified user of the VR terminal.

The foregoing and other described implementations can each, optionally, include one or more of the following features:

A first feature, combinable with any of the following features, wherein the interaction characteristics comprise any one of: a head posture of the user; a three-dimensional gesture; or a displacement track generated by movement of a visual focus, the visual focus controlled through the head posture, the three-dimensional gesture, or an external device.

A second feature, combinable with any of the previous or following features, wherein the user identity verification has been unsuccessful, and wherein the operations comprise: based on the unsuccessful user identity verification, determining a number of unsuccessful verification attempts; determining whether the number of unsuccessful verification attempts is greater than a preset number; based on the determination that the number of unsuccessful verification attempts is greater than the preset number, executing supplemental identity verification for the user; and based on a successful supplemental identity verification, executing the target task.

A third feature, combinable with any of the previous or following features, wherein the user identity verification has been successful, and wherein the operations comprise: obtaining, through the preset sensing hardware, additional interaction characteristics of the user interacting with the VR terminal, the additional interaction characteristics comprising behavioral interaction characteristics; comparing the obtained additional interaction characteristics of the user with behavioral interaction characteristics of the identity-verified user of the VR terminal to determine whether the user is the identity-verified user of the VR terminal; and based on the determination that the user is not the identity-verified user of the VR terminal, executing supplemental identity verification for the user.

A fourth feature, combinable with any of the previous or following features, wherein the comparing the obtained additional interaction characteristics of the user with behavioral interaction characteristics of the identity-verified user of the VR terminal comprises one or more instructions to: obtain a preset behavioral interaction characteristic identification model representing the behavioral interaction characteristics of the identity-verified user of the VR terminal, wherein the preset behavioral interaction characteristics identification model is generated by training with behavioral interaction characteristics training samples of the identity-verified user of the VR terminal using a preset deep learning algorithm; and compare the obtained additional interaction characteristics of the user with the preset behavioral interaction characteristic identification model to determine whether the user is the identity-verified user of the VR terminal.

A fifth feature, combinable with any of the previous or following features, wherein the executing supplemental identity verification for the user comprises one or more instructions to: obtain, through preset biometrics identification hardware, biometric characteristics of the user; compare the obtained biometric characteristics with preset biometric characteristics of the identity-verified user of the VR terminal to determine whether the user is the identity-verified user of the VR terminal; and based on the determination that the user is the identity-verified user of the VR terminal, verify the identity of the user; or obtain, from the user, an identity verification password; compare the obtained identity verification password with a preset identity verification password to determine whether the user is the identity-verified user of the VR terminal; and based on the determination that the user is the identity-verified user of the VR terminal, verify the identity of the user.

A sixth feature, combinable with any of the previous or following features, wherein the target task comprises a task for unlocking the VR terminal.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform operations comprising: obtaining, through preset sensing hardware, interaction characteristics of a user interacting with a virtual reality (VR) terminal in response to a request for execution of a target task requiring user identity verification; comparing the obtained interaction characteristics of the user with preset interaction characteristics of an authorized user of the VR terminal to verify identity of the user; and based on a successful user identity verification, executing the target task and authenticating the user as an identity-verified user of the VR terminal.

The foregoing and other described implementations can each, optionally, include one or more of the following features:

A first feature, combinable with any of the following features, wherein the interaction characteristics comprise any one of: a head posture of the user; a three-dimensional gesture; or a displacement track generated by movement of a visual focus, the visual focus controlled through the head posture, the three-dimensional gesture, or an external device.

A second feature, combinable with any of the previous or following features, wherein the user identity verification has been unsuccessful, and wherein the system is further configured to: based on the unsuccessful user identity verification, determine a number of unsuccessful verification attempts; determine whether the number of unsuccessful verification attempts is greater than a preset number; based on the determination that the number of unsuccessful verification attempts is greater than the preset number, execute supplemental identity verification for the user; and based on a successful supplemental identity verification, execute the target task.

A third feature, combinable with any of the previous or following features, wherein the user identity verification has been successful, and wherein the system is further configured to: obtain, through the preset sensing hardware, additional interaction characteristics of the user interacting with the VR terminal, the additional interaction characteristics comprising behavioral interaction characteristics; compare the obtained additional interaction characteristics of the user with behavioral interaction characteristics of the identity-verified user of the VR terminal to determine whether the user is the identity-verified user of the VR terminal; and based on the determination that the user is not the identity-verified user of the VR terminal, execute supplemental identity verification for the user.

A fourth feature, combinable with any of the previous or following features, wherein the comparing the obtained additional interaction characteristics of the user with behavioral interaction characteristics of the identity-verified user of the VR terminal is further configured to: obtain a preset behavioral interaction characteristic identification model representing the behavioral interaction characteristics of the identity-verified user of the VR terminal, wherein the preset behavioral interaction characteristics identification model is generated by training with behavioral interaction characteristics training samples of the identity-verified user of the VR terminal using a preset deep learning algorithm; and compare the obtained additional interaction characteristics of the user with the preset behavioral interaction characteristic identification model to determine whether the user is the identity-verified user of the VR terminal.

A fifth feature, combinable with any of the previous or following features, wherein the executing supplemental identity verification for the user is further configured to: obtain, through preset biometrics identification hardware, biometric characteristics of the user; compare the obtained biometric characteristics with preset biometric characteristics of the identity-verified user of the VR terminal to determine whether the user is the identity-verified user of the VR terminal; and based on the determination that the user is the identity-verified user of the VR terminal, verify the identity of the user; or obtain, from the user, an identity verification password; compare the obtained identity verification password with a preset identity verification password to determine whether the user is the identity-verified user of the VR terminal; and based on the determination that the user is the identity-verified user of the VR terminal, verify the identity of the user.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method for verifying user identity, comprising:
    obtaining, at a virtual reality (VR) terminal, an action performed by a user when interacting with the VR terminal, wherein the action is one of a set of pre-defined actions each associated with a pre-defined motion track for verifying user identity;
    calculating respective values of motion parameters that define at least an amount of rotation or translation of a part of user body when the user is performing the action when interacting with the VR terminal;
    determining, from the motion parameters and based on using computer graphics modeling techniques, an estimated motion track of the action performed by the user;
    determining a measure of similarity between the estimated motion track of the action performed by the user and the pre-defined motion track associated with the action, including determining whether the respective values of one or more of the motion parameters are within similarity tolerances associated with respective values of the one or more of the motion parameters derived from the pre-defined motion track; and
    when the measure of similarity satisfies a pre-defined similarity threshold:
        verifying identity of the user of the VR terminal.

2. The method of claim 1, wherein the set of pre-defined actions comprises any one of:
    a head posture of the user;
    a three-dimensional gesture; or
    a displacement track generated by movement of a visual focus, the visual focus controlled through the head posture, the three-dimensional gesture, or an external device.

3. The method of claim 1, further comprising:
    when the respective values of one or more of the calculated motion parameters are outside of similarity tolerances associated with respective values of the one or more of the motion parameters derived from the pre-defined motion track:
        determining that verification of the identity of the user of the VR terminal is unsuccessful.

4. The method of claim 3, further comprising:
    determining a number of unsuccessful verification attempts;
    determining whether the number of unsuccessful verification attempts is greater than a preset number; and
    when the number of unsuccessful verification attempts is greater than the preset number:
        executing supplemental identity verification for the user.

5. The method of claim 1, further comprising, after successfully verifying the identity of the user of the VR terminal:
    obtaining, through preset sensing hardware, behavioral interaction characteristics of the user interacting with the VR terminal;
    comparing the obtained behavioral additional interaction characteristics of the user with behavioral interaction characteristics of the identity-verified user of the VR terminal to determine whether the user is the identity-verified user of the VR terminal; and
    based on the determination that the user is not the identity-verified user of the VR terminal, executing supplemental identity verification for the user.

6. The method of claim 5, wherein the comparing the obtained behavioral interaction characteristics of the user with behavioral interaction characteristics of the identity-verified user of the VR terminal comprises:
    obtaining a preset behavioral interaction characteristic identification model representing the behavioral interaction characteristics of the identity-verified user of the VR terminal, wherein the preset behavioral interaction characteristics identification model is generated by training with behavioral interaction characteristics training samples of the identity-verified user of the VR terminal using a preset deep learning algorithm; and
    comparing the obtained behavioral interaction characteristics of the user with the preset behavioral interaction characteristic identification model to determine whether the user is the identity-verified user of the VR terminal.

7. The method of claim 4, wherein the executing supplemental identity verification for the user comprises:
    obtaining, through preset biometrics identification hardware, biometric characteristics of the user;
    comparing the obtained biometric characteristics with preset biometric characteristics of the identity-verified user of the VR terminal to determine whether the user is the identity-verified user of the VR terminal; and
    based on the determination that the user is the identity-verified user of the VR terminal, verifying the identity of the user; or
    obtaining, from the user, an identity verification password;
    comparing the obtained identity verification password with a preset identity verification password to determine whether the user is the identity-verified user of the VR terminal; and
    based on the determination that the user is the identity-verified user of the VR terminal, verifying the identity of the user.

8. A non-transitory, computer-readable medium storing one or more instructions executable by a computer system to perform operations for verifying user identity, the operations comprising:
   obtaining, at a virtual reality (VR) terminal, an action performed by a user when interacting with the VR terminal, wherein the action is one of a set of pre-defined actions each associated with a pre-defined motion track for verifying user identity;
   calculating respective values of motion parameters that define at least an amount of rotation or translation of a part of user body when the user is performing the action when interacting with the VR terminal;
   determining, from the motion parameters and based on using computer graphics modeling techniques, an estimated motion track of the action performed by the user;
   determining a measure of similarity between the estimated motion track of the action performed by the user and the pre-defined motion track associated with the action, including determining whether the respective values of one or more of the motion parameters are within similarity tolerances associated with respective values of the one or more of the motion parameters derived from the pre-defined motion track; and
   when the measure of similarity satisfies a pre-defined similarity threshold:
      verifying identity of the user of the VR terminal.

9. The non-transitory, computer-readable medium of claim 8, wherein the set of pre-defined actions comprises any one of:
   a head posture of the user;
   a three-dimensional gesture; or
   a displacement track generated by movement of a visual focus, the visual focus controlled through the head posture, the three-dimensional gesture, or an external device.

10. The non-transitory, computer-readable medium of claim 8, wherein the operations further comprise:
   when the respective values of one or more of the calculated motion parameters are outside of similarity tolerances associated with respective values of the one or more of the motion parameters derived from the pre-defined motion track:
      determining that verification of the identity of the user of the VR terminal is unsuccessful.

11. The non-transitory, computer-readable medium of claim 10, wherein the operations further comprise:
   determining a number of unsuccessful verification attempts;
   determining whether the number of unsuccessful verification attempts is greater than a preset number; and
   when the number of unsuccessful verification attempts is greater than the preset number:
      executing supplemental identity verification for the user.

12. The non-transitory, computer-readable medium of claim 8, wherein the operations further comprise, after successfully verifying the identity of the user of the VR terminal:
   obtaining, through preset sensing hardware, behavioral interaction characteristics of the user interacting with the VR terminal;
   comparing the obtained behavioral interaction characteristics of the user with behavioral interaction characteristics of the identity-verified user of the VR terminal to determine whether the user is the identity-verified user of the VR terminal; and
   based on the determination that the user is not the identity-verified user of the VR terminal, executing supplemental identity verification for the user.

13. The non-transitory, computer-readable medium of claim 12, wherein the comparing the obtained behavioral interaction characteristics of the user with behavioral interaction characteristics of the identity-verified user of the VR terminal comprises:
   obtaining a preset behavioral interaction characteristic identification model representing the behavioral interaction characteristics of the identity-verified user of the VR terminal, wherein the preset behavioral interaction characteristics identification model is generated by training with behavioral interaction characteristics training samples of the identity-verified user of the VR terminal using a preset deep learning algorithm; and
   comparing the obtained behavioral interaction characteristics of the user with the preset behavioral interaction characteristic identification model to determine whether the user is the identity-verified user of the VR terminal.

14. The non-transitory, computer-readable medium of claim 11, wherein the executing supplemental identity verification for the user comprises:
   obtaining, through preset biometrics identification hardware, biometric characteristics of the user;
   comparing the obtained biometric characteristics with preset biometric characteristics of the identity-verified user of the VR terminal to determine whether the user is the identity-verified user of the VR terminal; and
   based on the determination that the user is the identity-verified user of the VR terminal, verifying the identity of the user; or
   obtaining, from the user, an identity verification password;
   comparing the obtained identity verification password with a preset identity verification password to determine whether the user is the identity-verified user of the VR terminal; and
   based on the determination that the user is the identity-verified user of the VR terminal, verifying the identity of the user.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations for verifying user identity, the operations comprising:
      obtaining, at a virtual reality (VR) terminal, an action performed by a user when interacting with the VR terminal, wherein the action is one of a set of pre-defined actions each associated with a pre-defined motion track for verifying user identity;
      calculating respective values of motion parameters that define at least an amount of rotation or translation of a part of user body when the user is performing the action when interacting with the VR terminal;
      determining, from the motion parameters and based on using computer graphics modeling techniques, an estimated motion track of the action performed by the user;
      determining a measure of similarity between the estimated motion track of the action performed by the user and the pre-defined motion track associated with the action, including determining whether the respective values of one or more of the motion parameters are within similarity tolerances associated with respective values of the one or more of the motion parameters derived from the pre-defined motion track; and when the measure of similarity satisfies a pre-defined similarity threshold:
verifying identity of the user of the VR terminal.

16. The computer-implemented system of claim 15, wherein the set of pre-defined actions comprises any one of:
a head posture of the user;
a three-dimensional gesture; or
a displacement track generated by movement of a visual focus, the visual focus controlled through the head posture, the three-dimensional gesture, or an external device.

17. The computer-implemented system of claim 15, wherein the operations further comprise:
when the respective values of one or more of the calculated motion parameters are outside of similarity tolerances associated with respective values of the one or more of the motion parameters derived from the pre-defined motion track:
determining that verification of the identity of the user of the VR terminal is unsuccessful.

18. The computer-implemented system of claim 17, wherein the operations further comprise:
determining a number of unsuccessful verification attempts;
determining whether the number of unsuccessful verification attempts is greater than a preset number; and
when the number of unsuccessful verification attempts is greater than the preset number:
executing supplemental identity verification for the user.

19. The computer-implemented system of claim 15, wherein the operations further comprise, after successfully verifying the identity of the user of the VR terminal:
obtaining, through preset sensing hardware, behavioral interaction characteristics of the user interacting with the VR terminal;
comparing the obtained behavioral interaction characteristics of the user with behavioral interaction characteristics of the identity-verified user of the VR terminal to determine whether the user is the identity-verified user of the VR terminal; and
based on the determination that the user is not the identity-verified user of the VR terminal, executing supplemental identity verification for the user.

20. The computer-implemented system of claim 19, wherein the comparing the obtained behavioral interaction characteristics of the user with behavioral interaction characteristics of the identity-verified user of the VR terminal comprises:
obtaining a preset behavioral interaction characteristic identification model representing the behavioral interaction characteristics of the identity-verified user of the VR terminal, wherein the preset behavioral interaction characteristics identification model is generated by training with behavioral interaction characteristics training samples of the identity-verified user of the VR terminal using a preset deep learning algorithm; and
comparing the obtained behavioral interaction characteristics of the user with the preset behavioral interaction characteristic identification model to determine whether the user is the identity-verified user of the VR terminal.

21. The computer-implemented system of claim 18, wherein the executing supplemental identity verification for the user comprises:
obtaining, through preset biometrics identification hardware, biometric characteristics of the user;
comparing the obtained biometric characteristics with preset biometric characteristics of the identity-verified user of the VR terminal to determine whether the user is the identity-verified user of the VR terminal; and
based on the determination that the user is the identity-verified user of the VR terminal, verifying the identity of the user; or
obtaining, from the user, an identity verification password;
comparing the obtained identity verification password with a preset identity verification password to determine whether the user is the identity-verified user of the VR terminal; and
based on the determination that the user is the identity-verified user of the VR terminal, verifying the identity of the user.

* * * * *